United States Patent Office 3,687,667
Patented Aug. 29, 1972

3,687,667
PROCESS FOR FORMING POLYMER IMAGES
Yoshihide Hayakawa and Masato Satomura, Asaka-shi, Japan, assignors to Fuji Photo Film Co., Ltd., Kanagawa, Japan
No Drawing. Filed July 16, 1969, Ser. No. 842,379
Claims priority, application Japan, July 16, 1968, 43/50,097
Int. Cl. G03c 1/70, 5/26
U.S. Cl. 96—48 R      30 Claims

ABSTRACT OF THE DISCLOSURE

A process for forming a polymer image which comprises applying to a photographic silver halide emulsion layer bearing a photographic latent image at least one member selected from the group consisting of metaphenylenediamine, 1,8-diaminonaphthalene, 2,7-diaminonaphthalene, and derivatives of the diaminonaphthalenes in the presence of at least one member selected from the group consisting of an addition-polymerizable vinylidene monomer and a vinyl monomer and conducting the polymerization of said monomer selectively at the latent image-bearing portion of said emulsion layer.

BACKGROUND OF THE INVENTION (1) Field of the invention

The present invention relates to a process for forming images of a polymer and more particularly to a process for selectively forming a high molecular weight compound at the areas corresponding to a photographic latent image by the action of a photographic silver halide emulsion and a reducing agent.

(2) Description of the prior art

Various methods have been proposed for forming images of high molecular weight compounds by polymerizing vinylic compounds by the action of light. Also, it has been proposed to directly cause the photopolymerization of vinylic monomers using a silver halide as a catalyst (British Pat. 866,631 and S. Levinos et al.; "Photographic Science & Engineering"; vol. 6, 222–226 (1962)). In the reaction, the product formed by the photo-decomposition of silver halide directly acts as the catalyst for the polymerization, with the result that the sensitivity in the polymerization system is far lower than the case when the silver halide particles are reduced by the usual development.

Moreover, it has been proposed to form an image of a high molecular weight compound by developing exposed silver halide particles of a silver halide emulsion layer in a usual developer and conducting the polymerization of the vinyl compound using as the catalyst the silver image or the image of the unreacted silver halide formed by the development (Belgian Pat. 642,477). However, such a method has the disadvantage that, for conducting the reaction, the developing procedure must be carried out separately from the polymerization procedure.

A method of causing the polymerization of a vinyl compound by the oxidation product or an intermediate product thereof formed by developing exposed silver halide particles with a reducing compound in the presence of a vinyl compound is theoretically interesting, since, in the process, the amplification actions by development and chain polymerization can be utilized. Accordingly, it has been proposed to conduct such a reaction using as a reducing agent a so-called benzenoid compound having at least two hydroxyl groups, amino groups or alkyl- or aryl-substituted amino groups at the ortho- or para-positions of the benzene ring (U.S. Pat. 3,019,104 and G. Oster; "Nature"; vol. 180, 1275 (1957)).

SUMMARY OF THE INVENTION

An object of the present invention is to provide a method of converting the latent image obtained by the irradiation of electromagnetic waves, such as light or particle rays, into the image of a high molecular weight material.

Another object of the present invention is to provide a method of forming polymer images having desired properties by utilizing the above process in a recording method.

The inventors have found that by reducing a silver halide, using a metaphenylenediamine or a diaminonaphthalene described below, in the presence of a vinyl compound, the polymerization of the above vinyl compound can be caused. Moreover, when a photographic silver halide emulsion is employed as the silver halide in the aforesaid polymerization, the polymerization reaction occurs more rapidly in the case where the fine crystals of silver halide retain developing nuclei and, hence, by suitably selecting the reaction conditions and the reaction time, the polymerization can be selectively caused only at areas having silver halide particles retaining developing nuclei.

The objects of this invention can be achieved by utilizing the aforesaid facts thus discovered. That is, the aforesaid objects of the present invention can be achieved by adding at least one of the m-phenylenediamines and diaminonaphthalenes to a photographic silver halide emulsion layer, having a photographic latent image, in the presence of a vinyl compound capable of being polymerized, whereby the polymerization of the vinyl compound can be selectively caused at the areas bearing the photographic latent image.

DETAILED DESCRIPTION OF THE INVENTION

The photographic latent image comprises an invisible image-wise change formed in a photographic silver halide emulsion layer by the action of electromagnetic waves or particle rays. Such a latent image can be converted into a visible image by development. In a usual silver halide emulsion layer forming a negative image, such a latent image is formed by forming developing nuclei at the silver halide particles exposed to electromagnetic waves or particle rays. In a silver halide emulsion layer forming a direct positive image, the latent image is formed by destroying the developing nuclei originally present on every silver halide particle by exposing the layer to electromagnetic waves or particle rays (James & Huggings; "Fundamentals of Photographic Theory," 2nd edition, paragraphs 3 and 4, published by Morgam & Morgam Co. (1960)).

In the process of this invention, there may be employed a photographic silver halide emulsion capable of forming a negative image by development, that is, a silver halide emulsion forming developing nuclei at the silver halide particles exposed to electromagnetic waves or particle rays, or a silver halide emulsion forming a so-called direct positive image, that is, a photographic silver halide emulsion wherein a larger number of developing nuclei are present at the silver halide particles of non-exposed areas than exposed areas.

As the photographic silver halide emulsion capable of forming a negative image, a conventional photographic silver halide emulsion used for usual developing procedure can be preferably used in the present invention. That is, a silver chloride emulsion, a silver bromide emulsion, a silver chlorobromide emulsion, a silver iodobromide emulsion, and a silver chloroiodo-bromide emulsion may be employed in the present invention.

The photographic silver halide emulsion used in this invention may be subjected to both conventional chemical sensitization and optical sensitization. This is, the silver halide emulsion may be subjected to a sulfur sensitization and a noble metal sensitization as the chemical sensitization (e.g., P. Grafkides; "Chimie Photographique"; 2nd edition, 247–301 (1957), Photocinema Paul Montel Paris). Also, as the optical sensitization, an optical sensitizing dye used in a conventional photographic method, such as a cyanine dye or a merocyanine dye can be effectively used. Also, the silver halide emulsion used in the present invention may contain a stabilized used in normal photographic methods.

On the other hand, the photographic silver halide emulsion capable of forming a direct positive image may be prepared by utilizing solarization, a Herschell effect, a Clayden effect or a Sabattier effect. These effects are described in, for example, C. E. K. Mees; "The Theory of the Photographic Process"; 2nd edition, paragraphs 6 and 7, MacMillan Co., 1954.

In order to prepare the photographic silver halide emulsion layer capable of forming a direct positive image by utilizing solarization, a photographic silver halide emulsion layer susceptible to solarization is first prepared and the entire surface of the emulsion layer may be exposed to preliminary light or may be subjected to chemical action so that the surface of the emulsion layer thus exposed or subjected to chemical action can be sufficiently developed without further necessity of image exposure. Methods of preparing such silver halide emulsion layers are disclosed in, for example, the specifications of British Pats. 443,245 and 462,730.

The Herschell effect is obtained by exposing to light of long wave length an emulsion layer which has been fogged uniformly by exposure to light or by the action of a chemical agent. In this case, a silver halide emulsion containing predominantly silver chloride is profitably used. Furthermore, for promoting the occurence of the Herschell effect, a desensitizing dye such as pinakryptol yellow, phenosafranine, etc., may be incorporated in the silver halide emulsion. The manner of preparation of the silver halide emulsion utilized for direct positive image formation utilizing the Herscheel effect is disclosed in, for example, the specifications of U.S. Pat. 2,857,273 and British Pat. 667,206.

For preparing a photographic silver halide emulsion layer utilized for direct positive image formation by utilizing the Clayden effect, it is necessary to image-expose a silver halide emulsion layer for a short period of time with a high intensity light and thereafter uniformly expose the entire surface of the emulsion layer with a low intensity light, whereby the entire surface of the emulsion layer is brought into a developable state.

The Sabattier effect is caused by image-exposing a silver halide emulsion layer, and thereafter uniformly exposing the entire surface thereof in a developer, or subjecting the entire surface thereof to a chemical action, whereby the areas of the emulsion layer not subjected to the image-exposure are brought into a developable state.

Also, the Clayden effect and the Sabittier effect can be easily and practically caused when, depending on the silver halide emulsion used, the tendency of forming developing developing nuclei by the initial light exposure is stronger in the inside of the silver halide particles than on the surface of the particles. The preparation of such a silver halide emulsion is described in, for example, the specifications of U.S. Pats. 2,592,250 and 2,497,876, British Pat. 1,011,062, and German Pat. 1,207,791.

The aforesaid photographic silver halide emulsions comprise systems wherein silver halide emulsions are dispersed in a solution of a high molecular weight material. As such a high molecular weight material, gelatin is most widely employed, but a synthetic high molecular weight material such as polyvinyl alcohol, polyvinyl pyrrolidone, polyacrylamide, etc., and derivatives of natural high molecular weight material such as carboxymethyl cellulose, cellulose oxyethyl ether, dextrane, etc., may be used alone or together with gelatin (e.g., F. Evva; "Zeitschrift fur Wissenschaftliche Photographie. Photophysik und Photochemie"; vol. 52, 1–24 (1957)).

The metalphenylenediamine and the derivatives thereof used in the present invention are compounds represented by the general Formula I

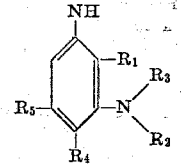

wherein $R_1$ represents a hydrogen atom, an alkyl group, or a carbovyl group; $R_2$ and $R_3$ each representas a hydrogen atom, an alkyl group, or an acryl group; $R_4$ represents a hydrogen atom, a sulfonyl group, an alkyl group, a methoxy group, or an arylazo group; and $R_5$ represents a hydrogen atom, an amino group or a carboxyl group.

The following are given as examples of the above compounds, which may be prepared by well known methods as well as being commercially available: m-phenylenediamine, N,N-dimethyl-m-phenylenediamine, 2,4-diaminotoluene, 2,4-diaminobenzenesulfonic acid, 2,4-diaminoanisole, 2,4,6-triaminotoluene, 3,5-diamino benzoic acid, methoxy red, m-acetoacetylaminoaniline, and 2,6-diaminotoluene.

The naphthalenediamines used in this invention are naphthalenediamines each having two amino groups at the 1 and 3 positions, 1 and 6 positions, 1 and 8 positions or 2 and 7 positions of the naphthalene ring. They may also have one or two sulfone groups on the naphthalene ring. These compounds are hereinafter referred to as "Compound II."

Typical examples of these compounds are 1,8-diaminonaphthalene, 3,7-diaminonaphthalene, 1,8-diaminonaphthalene-3,6-disulfonic acid, 1,3-diaminonaphthalene, 1,6-diaminonaphthalene, 1,8-diaminonaphthalene - 4,5 - disulfonic acid, 1,3 - diaminonaphthalene - 5 - sulfonic acid, 1,3 - diaminonaphthalene - 6 - sulfonic acid, and 1,6-diaminonaphthalene-4-sulfonic acid.

In the process of this invention, a silver halide is used as a form of photographic silver halide emulsion for increasing the selectivity in reaction, that is, the difference in reactivity between the portions irradiated by electro magnetic waves or particle rays.

The reaction mechanism of the polymerization of the vinyl compound as the result of the reduction of the silver halide by the aforesaid compound I or II has not yet been determined but, in general, the polymerization is considered to be a radical polymerization since a compound susceptible to radical polymerization is employed, the reaction is carried out in an aqueous solution, and also a radical polymerization inhibitor retards the reaction when the inhibitor is present in the reaction system. Also, it has not yet been determined whether radicals are directly formed by the reaction of compound I or II with the silver halide, or formed by the cooperative action of the water, oxygen, etc., present in the reaction system with the above components. However, when the vinyl compound is added to the reaction system after reducing the exposed silver halide by compound I or II, the occurence of polymerization is not observed and hence it is clear that the polymerization of the vinyl compound occurs at the same time that the silver halide is reduced. Accordingly, it is considered that an intermediate reaction product of the silver halide and compound I or II contributes to the polymerization.

When the reaction is stopped after a proper period of time, a high molecular weight compound can be selectively formed only at the areas exposed to light or other radiations, but when the reaction is continued further, the high molecular weight compound is formed at the unexposed areas. However, such a phenomenon usually occurs in usual photographic procedure, that is, when a usual photographic light-sensitive film or paper is developed, after exposure, for a longer period of time, the entire surface thereof, i.e., the exposed areas as well as the unexposed areas, are blackened to form a so-called fog. Therefore, the aforesaid phenomenon will not spoil the practicability of the present invention.

As a process for forming an image of a high molecular weight material by utilizing the light-sensitivity of silver halide, there is known a so-called tanning development method in which gelatin is cross-linked by the oxidation product of a developing agent. However, in such a known method, the image formed is limited to the cross-linked gelatin. On the other hand, according to the process of this invention, images of high molecular weight compounds having various properties can be formed in response to the vinyl compounds employed, and the desired properties of the image that cannot be obtained utilizing the cross-linked gelatin, such as, a dyeing property, resistance to chemical reagents, etc., can be obtained.

Furthermore, the inventors have found that when sulfide ions are present in the reaction system, the polymerization of the vinyl compound can be promoted.

The sulfide ions may be supplied by either adding a compound ordinarily having sulfite ions, such as, a sulfite or a bisulfite of an alkali metal or ammonium, or by adding a compound capable of being dissolved in an aqueous solution to form sulfite ions, such as an adduct of an aldehyde, e.g., formaldehyde or glyoxal and a bisulfite or a pyrosulfite of an alkali metal or ammonium. The amount of the sulfite ions to be added to the reaction system is influenced by the kinds and amounts of the reducing agent and the vinyl monomer to be employed and also the pH of the reaction system, and is preferably more than 0.05 mole and, more preferably, more than 0.2 mole per liter of the reaction system.

It is well known to add sulfite to a photographic developer. In this case, however, the sulfite is considered to prevent the spontaneous oxidation of the developing agent and to prevent the uneven occurrence of the development reaction by the reaction thereof with the oxidation product of a developing agent such as hydroquinone or p-aminophenol (cf., e.g., C. E. K., Mees; "The Theory of the Photographic Process"; 2nd edition, 652 (1954), published MacMillion Co.). On the other hand, in the present invention, the intermediate oxidation product of the m-phenylenediamine or the diaminonaphthalene with the silver halide initiates the polymerization and, hence, it shall be noticed that the polymerization promoting effect of the sulfite in the present invention is fundamentally different from the aforesaid action of removing the oxidation product in a usual developer.

In other words, if the sulfite is used only to remove the oxidation product, the polymerization of the present invention will be suppressed further by the addition of the sulfite.

The vinyl compounds used in the present invention may be liquid or solid addition polymerizable compounds or a mixture thereof. As such vinyl compounds, there are acrylamide, acrylonitrile, N-hydroxymethyl acrylamide, methacrylic acid, acrylic acid, calcium acrylate, sodium acrylate, methacrylamide, methyl methacrylate, methyl acrylate, ethyl acrylate, vinyl-pyrrolidone, vinyl methyl ether, vinyl butyl ether, vinyl isopropyl ether, vinyl isobutyl ether, vinyl butyrate, 2-vinyl-pyridine, 4-vinylpyridine, 2-methyl-N-vinylimidazole, potassium vinyl-benzene sulfonate, vinylcarbazole, and the like.

In the process of this invention, a vinyl compound having a plurality of vinyl groups can be preferably used and such a vinyl compound may be used alone or together with the aforesaid compounds having one vinyl group. Examples of these vinyl compounds having a plurality of vinyl groups are: N,N'methylenebisacrylamide, ethyleneglycol dimethacrylate, diethyleneglycol dimethacrylate, triethyleneglycol dimethacrylate, polyethyleneglycol dimethacrylate, divinyl ether, divinylbenzene, and the like.

Moreover, in the process of this invention, a water-soluble vinyl compound is preferably employed but a water-insoluble vinyl compound may be employed by adding the compound as an emulsion thereof. The emulsification may be conducted by means of a suitable stirrer in the presence of a surface-active agent or a high molecular weight compound according to the conventional method.

Any electromagnetic waves and particle rays to which usual photographic silver halide emulsions are sensitive in the process of this invention may be utilized. That is, visible rays, ultraviolet rays, infrared rays, X-rays, gamma rays, electron beams, alpha particle beams, and the like may be utilized.

It is necessary to conduct the process of this invention by the two steps of exposure to electromagnetic waves or particle rays and polymerization reaction by reduction. In particular, for conducting the recording of images, it is desirable that the locational transfer of silver halide particles be negligible between the exposure to electromagnetic waves or particle rays the polymerization reaction, and accordingly, it is also desirable that the reaction system be maintained at a highly viscous liquid state or at a gelatinous state. Since natural or synthetic high molecular weight material is present ordinarily in photographic silver halide emulsions, the emulsions usually have a considerably high viscosity or can be gelled, but if the viscosity or gellation is insufficient, a high molecular weight material may be further added to the system or to the photographic emulsion.

In the case of exposing to electromagnetic waves or particle rays, the silver halide may be in an aqueous solution or in the form of a dried gel. That is, the highly viscous or gelatinous photographic silver halide emulsion may be applied to a proper support and used before drying or after drying.

Since the reduction and the polymerization occur at the same time, the reduction must be conducted in the presence of the vinyl compound. In the process of this invention, compound I or II, acting as a reducing agent for the silver halide, and the vinyl compound may be simultaneously preliminarily incorporated in the photographic silver halide emulsion, or one of them may be incorporated in the photographic silver halide emulsion and, after exposure, the other may be added to the system.

For the practice of the reduction and polymerization of this invention, the presence of water is inevitable and hence it is necessary to conduct the reaction in an aqueous solution or in a wet state.

The reaction of the present invention generally proceeds more smoothly in an alkaline state. The most suitable pH for the reaction is influenced by the kinds and concentrations of silver halide, reducing agent and high molecular weight binder material and also by the reaction temperature. However, the reaction of this invention can be practiced at a pH higher than about 6 and preferably more than 7.

In the case of using the photographic silver halide emulsion as an emulsion layer applied to a support, the emulsion layer may be immersed, after exposure to electro-magnetic waves or particle rays, in an alkaline aqueous solution to start the reaction. It is preferable that the reducing agent or the vinyl compound be incorporated in the alkaline aqueous solution.

The reaction of this invention may be readily stopped by acidifying the system, that is, by reducing the pH of the reaction system to less than 5, but it may also be stopped by cooling the system, removing the reactants by washing, dissolving the silver halide utilizing a photographic fixing solution or adding a polymerization inhibitor to the reaction system.

In the case where the vinyl compound and the high molecular weight binder material for the silver halide are preliminarily formed into a layer, it is desirable to incorporate a small amount of a thermal polymerization inhibitor in the layer to pervent the vinyl compound from being thermally polymerized. In such a case, any thermal polymerization inhibitor employed for the usual radical polymerization may be profitably employed. As examples, there are p-methoxyphenol, hydroquinone, an alkyl hydroquinone, 2,6-di-t-butyl-p-cresole, β-naphthol, and the like.

In the case of preliminarily incorporating the vinyl compound in the reaction system, the amount of the vinyl compound used is preferably $\frac{1}{30}$ to 30 times, more preferably $\frac{1}{4}$ to 4 times, the amount of the high molecular weight compound added preliminarily. Also, the amount of silver halide is preferably $\frac{1}{100}$ to 2 times and more preferably $\frac{1}{10}$ to $\frac{1}{2}$ times, the amount of the high molecular weight compound. Furthermore, in the case of adding a thermal polymerization inhibitor, the amount of the inhibitor is preferably $\frac{1}{100,000}$ to $\frac{2}{100}$ times the amount of the vinyl compound. Also, in the case of preliminarily incorporating the reducing agent in the reaction system, the amount of the reducing agent is preferably $\frac{1}{10}$ to 20 moles per one mole of silver halide employed.

When the vinyl compound is added to the processing solution, the concentration thereof is preferably as high as possible and the amount thereof is rather restricted by the solubility of the vinyl compound employed in the processing solution. Furthermore, when the m-phenylenediamine used as the reducing agent is incorporated in the processing solution, the concentration thereof is preferably $\frac{1}{20}$ to 5 moles and, more preferably, $\frac{1}{10}$ to 1 mole per liter.

Analogous to the photographic procedure, the polymerization of this invention may be conducted after exposure to electromagnetic waves or particle rays with a desired time interval. According to the properties of the photographic emulsion to be employed, the condition where the reaction system is allowed to stand, and the period thereof, the exposure effect may sometimes be reduced. In such a case, the desired effect can be obtained by increasing the exposure amount.

When the process of this invention is applied to recording of an image, the differences in physical and chemical properties between the polymerized portion and the unpolymerized one, such as, solubility, light scattering property, tackiness, dyeing property, etc., can be utilized variously. For example, by dissolving off the unpolymerized portions by utilizing the difference in solubility after conducting exposure and the polymerization reaction, the image of the high molecular weight material can be left at only the exposed portions to form the image.

In such a case, it is preferable that the high molecular weight material added initially be dissolved off together with the unreacted monomer. For this purpose, it is preferable that the high molecular weight material contained initially in the reaction system be a linear, high molecular weight material in which almost no cross linkage has been formed, or a high molecular weight material the main chain or the cross-linkage of which can be readily cut. On the other hand, the high molecular weight compound formed by the polymerization reaction of this invention may be a cross linked polymer. For this purpose, it is preferable to employ a vinyl compound having a plurality of vinyl groups alone or together with a vinyl compound having one vinyl group. However, the use of the vinyl compound having a plurality of groups is not an inevitable factor since even though the high molecular weight material produced is a two-dimensional and soluble high molecular weight material, there frequently occurs a remarkable difference in solubility between the portions where the high molecular weight compound is formed and the portions having no such high molecular weight compound as the result of the interaction of the high molecular weight material formed and a high molecular weight compound preliminarily added to the reaction system (for example, wherein polyacrylic acid and gelatin is employed).

Furthermore, the present invention can be utilized for the formation of dye images or colored images. In this process, a vinyl monomer having a group capable of having electric charges by electric dissociation or addition of hydrogen cations is used as the vinyl monomer to provide a polymer capable of having electric charges by electric dissociation or addition of hydrogen cations. The image of the polymer having the charges is then selectively dyed by a dye having charges opposite to the charges of the polymer. Moreover, the dye images thus formed may be transferred onto other supports by various methods known in the field.

As the addition polymerizable vinyl compound capable of having charges by electric dissociation or the addition of hydrogen cations utilized in this invention, the following two kinds of vinyl monomers may be utilized.

Firstly, as a vinyl compound capable of providing negative charges on the high molecular weight compound formed, there may be illustrated a vinyl compound having a carboxylic group, such as acrylic acid, methacrylic acid, itaconic acid, or maleic acid; a vinyl compound having a metal salt or ammonium salt of a carboxyl group, such as, ammonium acrylate, sodium acrylate, potassium acrylate, calcium acrylate, magnesium acrylate, zinc acrylate, cadmium acrylate, sodium methacrylate, calcium methacrylate, magnesium methacrylate, zinc methacrylate, cadmium methacrylate, sodium itaconate or sodium maleate; a vinyl compound having a sulfonyl group, such as, vinyl sulfonic acid or p-vinylbenzene sulfonic acid; and a vinyl compound having a metal salt or ammonium salt of sulfonic acid, such as, ammonium vinylsulfonate, potassium vinylsulfonate, or potassium p-vinyl-benzenesulfonate.

Secondly, as a vinyl compound capable of providing positive charges on the high molecular weight compound formed, there may be illustrated a vinyl compound having a basic nitrogen atom, such as, 2-vinylpyridine, 4-vinylpyridine, 5 - vinyl - 2-methylpyridine, N,N-dimethylaminoethyl acrylate, N,N-dimethyl-aminoethyl methacrylate, N,N-diethylaminoethyl acrylate, or N,N-diethylaminoethyl methacrylate and a vinyl compound having the nitrogen atom of a quaternary salt prepared by reacting a base of the aforesaid vinyl compound and methyl chloride, ethyl bromide, dimethyl sulfate, diethyl sulfate, or methyl p-toluene-sulfonate.

These vinyl compounds may be prepared by well known methods or may be commercially available. These compounds may be used alone or as a combination thereof. Also, the vinyl compounds shown above may be used together with a water-soluble addition polymerizable vinyl compound having no charge. As the vinyl compound which can be used together with the aforesaid vinyl compounds in this embodiment of the present invention, the following may be mentioned: acrylamide, N-hydroxymethyl acrylamide, methacrylamide, methyl methacrylamide, vinylpyrrolidone, N,N-methylene-bis-acrylamide, triethyleneglycol dimethacrylate, polyethyleneglycol dimethacrylate, and the like.

In the case of using the above-mentioned vinyl compounds together with the above vinyl compounds having no charge, the relation of the reactivity of the vinyl compounds and the amount of them should be selected adequately, lest the high molecular weight compound formed should contain substantially no group having the property of being electrolytically dissociated caused by the polymerization of only the vinyl compound having no charge.

As the dye capable of having a charge by being dissociated electrolytically, usual acid dyes and basic dyes can be generally employed. That is, wherein a vinyl compound providing a high molecular weight compound having a negative charge is employed, a basic dye is used, while in the case of employing the vinyl compound providing a high molecular weight compound having a positive charge, an acid dye is used. In other words, since a basic dye is positively charged, the dye has a good dyeing affinity to a high molecular weight compound having a negative charge, while, since an acid dye has negative charges, the dye has a good dyeing affinity to a high molecular weight compound having a positive charge. Thus, in both cases, a dye image corresponding to an image of the high molecular weight compound formed can be obtained.

When gelatin is employed as a binder for the photographic silver halide emulsion, the isoelectric point of gelatin must be considered in dyeing the image since gelatin is an amphoteric electrolyte. In other words, gelatin has a negative charge at a pH higher than the isoelectric point thereof, while it has a positive charge at a pH lower than the isoelectric point. Therefore, when a high molecular weight compound having a negative charge is present, by dyeing the image of the high molecular weight compound with a basic dye at a pH lower than the isoelectric point of gelatin, only the image of the high molecular weight compound can be dyed without dyeing the gelatin present as the binder. Also, when the image-bearing surface of a photographic silver halide emulsion layer is first uniformly dyed at a pH higher than the isoelectric point of gelatin and then washed with a solution having a pH lower than the isoelectric point of gelatin, only the portions having no images of the high molecular weight compound are washed off leaving only the portions having the images of the high molecular weight compound in a dyed state. Furthermore, when an image of a high molecular weight compound having a positive charge is dyed with an acid dye, the procedure may be conducted at a pH higher than the isoelectric point of a gelatin in the same manner as above. Of course, if the pH is too high or too low, the solubility of the dye will be reduced and also the electrolytic dissociation of the high molecular weight compound having the charge will be disturbed. Accordingly, the optimum pH range is influenced by the kind of the vinyl compound and the dye to be used and also the kind of binder, such as gelatin. However, usually, the pH is suitably 2.5–4.5 when gelatin having an isoelectric point of about 4.9 is employed and the image of a high molecular weight compound having a negative charge is dyed with a basic dye, while the pH is suitably 5.0–8.0 when the image of a high molecular weight compound having a positive charge is dyed with an acid dye.

Typical examples of the acid dye employed in the present invention are C.I. Acid Yellow 7 (C.I. 56205), C.I. Acid Yellow 23 (C.I. 19140), C.I. Acid Red (C.I. 18050), C.I. Acid Red 52 (C.I. 45100), C.I. Acid Blue 9 (C.I. 42090), C.I. Acid Blue 45, C.I. Acid Blue 62 (C.I. 62045), C.I. Acid Violet 7 (C.I. 18055) and the like. Examples of the basic dye used in the present invention are C.I. Basic Yellow 1 (C.I. 49005), C.I. Basic Yellow 2 (C.I. 41000), C.I. Basic Red 1 (C.I. 45160), C.I. Basic Red 2 (C.I. 50240), C.I. Basic Blue 25 (C.I. 52025), C.I. Basic Violet 3 (C.I. 42555), C.I. Basic Violet 10 (C.I. 45170) and the like.

The dye numbers shown above are based on Color Index (2nd edition) and these dyes are commercially available by various trade names.

For practicing the embodiment of the present invention as mentioned above, it is necessary that the reduction polymerization reaction be carried out after the irradiation with electromagnetic waves or particle rays and the dyeing of the emulsion layer or the image of the high molecular weight compound thus formed.

When only the non-polymerized vinyl monomer is washed out after conducting the irradiation, reduction and polymerization, the image of a polymer can be left. That is, as a polymer is generally less insoluble than a monomer, and also when a high molecular weight compound such as gelatin added from the first to the photographic silver halide emulsion as the binder is left undissolved in water, the polymer formed is scarcely diffused in the gelatin layer, and only the polymer portions are left to provide the image. When a monomer having more than two vinyl groups is used, the insolubility and the undiffusing property of the polymer formed can be increased.

By conducting dyeing after carrying out the polymerization as mentioned above, a dye image corresponding to the image of the high molecular weight compound can be obtained. The dye can be utilized as a clear dye image by removing the silver halide by a fixing process and by dissolving off the silver image with an oxidizing agent and solvent for silver salt. When a reducing agent having a good polymerization-initiating efficiency is employed, the polymerization reaction occurs sufficiently even in a state where a slight amount of reduced silver is formed and hence, in such a case, the removal of the silver image by oxidation is not, or scarcely, necessary.

Moreover, in the process of this invention, the dye image thus formed may be transferred to other image-receptive supports. The image transfer is conducted by wetting the layer having the dye image prepared as above with a solvent for the dye, such as, methanol, water, or an aqueous solution of an acid, a base or a salt and bringing the layer in close contact with a support. As the support to which the dye image is transferred, a usual paper, a paper having coated thereon a hydrophilic polymer layer or a gelatin layer, and a film having coated thereon a hydrophilic polymer layer or a gelatin layer may be employed.

In the case of transferring the dye image onto a support having coated thereon a gelatin layer, it is preferable to use the support mordanted with an aluminum salt, etc., as in a conventional dye transfer method.

When an image of a high molecular weight compound having a charge is once formed, a plurality of copies of the image can be obtained by conducting dyeing and transferring as mentioned above. Also, by the procedure as mentioned above, a plurality of transferred images can be obtained by only one dyeing procedure and also many dyeing procedures can be repeated about one polymer image formed. In other words, by the process of this invention, a plurality of copies can be obtained easily and in a simple manner.

Furthermore, the development and polymerization by a phenylenediamine or naphthalenediamine of this invention can be promoted by using a small amount of a usual photographic developing agent together with the amine, or by pretreating the emulsion layer in a conventional photographic developer. This is the same phenomenon as the development and the polymerization (by a resorcinol, a methaminophenol, a phenol, a 5-pyrazolone, or a naphthol) promoting effects obtained by using a small amount of a usual photographic developing agent. As such a conventional developing agent, there may be illustrated a compound having the formula

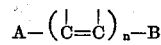

(wherein A and B each represents OH, —NH$_2$ or

—NHR where R is an alkyl group or a substituted alkyl group and $n$ is a positive integer), a 1-aryl-3-oxopyrazolidine, or a 1-aryl-3-iminopyrazolidine. Although such a conventional photographic developing agent as shown above does not initiate the polymerization of vinyl compounds, by the addition of the conventional developing agent, the developing action of the reducing agent which initiates the polymerization is promoted, which results in promoting the polymerization reaction of the system.

The metaphenylenediamines and the naphthalenediamines of this invention are different from the conventional developing agents in that the positions of the two amino groups on the benzene ring or the naphthalene ring are not in a conjugated relation.

The present invention will be further illustrated by the following examples, which are intended to be non-limiting in nature.

prolonged. This phenomenon is the same as the fact that when a conventional photographic emulsion layer is developed for too long a period of time after exposure, the unexposed portions are reduced to form so-called fog and finally, the image formed becomes unobservable. Thus, the aforesaid phenomenon will not injure the utilization of the photographic light-sensitive element of the present invention.

TABLE I

| Compound | (A) (° C.) | (B) (mg.) | (C) (ml.) | (D) (min.) | (E) (° C.) | (F) (° C.) |
| --- | --- | --- | --- | --- | --- | --- |
| N,N-dimethyl-m-phenylenediamine | 42 | 828 | 1.0 | 24 | 66 | 44 |
| 2 HCl | 42 | 828 | 2.0 | 17 | 75 | 57 |
| 2,4-diaminobenzene sulfonic acid | 60 | 94 | 2.0 | 12 | 76 | 60 |

NOTE.—(A) temperature of the water bath; (B) amount of the compound; (C) amount of 1 N NaOH used; (D) time required to reach the maximum temperature; (E) temperature of the exposed emulsion system; and (F) temperature of the unexposed emulsion system.

EXAMPLE 1

A fine grain photographic silver chlorobromide emulsion containing 20 g. (as silver) of silver chlorobromide, having a chlorine to bromine mole ratio of 7:3, about 30 g. of polyvinyl pyrrolidone, and about 100 g. of polyvinyl alcohol per liter of the emulsion, was divided into two parts and one of them was exposed to a fluorescent lamp. The exposure was conducted by spreading, at about 35° C., about 200 ml. of the liquid emulsion over a vat of 20 cm. x 25 cm. in area and allowing it to stand for about 10 minutes while the emulsion was under a light source of about 300 luxes while stirring the emulsion. A test tube of about 1.6 cm. in diameter was charged with 10 ml. of the exposed emulsion while another test tube was charged with the unexposed emulsion in the same way. In the silver halide emulsion was dissolved 4.0 g. of acrylamide and thereafter 2 ml. of water and 1 ml. of 1 mole/liter solution of the phenylenediamine derivatives shown in Table I.

After stirring the emulsion and controlling the temperature of the system as shown in Table I, the test tube was placed in a heat insulating material comprising a polystyrene foam of about 2 cm. in thickness. The whole system was immersed in a water bath maintained at the constant temperature shown in the table. Thereafter, an aqueous 1 N sodium hydroxide solution was immediately added to the emulsion in an amount shown in the table and the variation of temperature was recorded by means of a thermistor-type temperature recorder.

In the exposed silver halide emulsion, the polymerization of acrylamide occurred, the temperature of the system was increased by the heat of polymerization, and the viscosity of the emulsion was markedly increased by the polyacrylamide thus formed. On the other hand, in the unexposed silver halide emulsion, the viscosity increase of the emulsion was scarcely observed and also the increase of temperature was very slight. In addition, in the exposed silver halide emulsion, the silver halide had been reduced to silver to be colored brown, while in the unexposed emulsion, the discoloration was scarcely observed. Thus, it was confirmed that when acrylamide was not present, no heat generation occurred and the fluidity of the emulsion was not lost.

Thus, it is clear from the generation of the heat of polymerization and the change in fluidity of the whole system that the polymerization occurred in the exposed emulsion. The reduction of silver halide may generally be accompanied by the generation of heat but the amount of the heat generated is slight and the temperature change is not detected by the means used in the experiment. For example, when hydroquinone was used instead of N,N-dimethyl-m-phenylenediamine in the aforesaid procedure, silver halide was reduced to provide black silver but no generation of heat was observed. When the unexposed silver halide emulsion was used, the heat of polymerization was detected when the reaction period of time was prolonged.

EXAMPLE 2

In this example, a monomer scarcely soluble in water such as tetraethyleneglycol dimethacrylate was polymerized after being emulsified.

That is, an emulsion of tetraethyleneglycol methacrylate was prepared by mixing 40 ml. of the monomer and 40 ml. of a 40% aqueous solution of gelatin and emulsifying the mixture by means of a high speed emulsifier with the addition of 3.0 g. of a surface active agent. A fine grain photographic gelatino silver chlorobromide emulsion containing 42 g. of silver chlorobromide having a chlorine to bromine mole ratio of 7:3 and about 60 g. of gelatin per one liter of emulsion, having a pH of 5.8 and pAg of 7.6, was divided into two parts and one of them was exposed to a fluorescent lamp. The exposure was conducted by spreading about 200 ml. of the emulsion mixture over a vat of 20 cm. x 25 cm. in area at a temperature of about 35° C. and then exposing the emulsion for about 5 minutes to a light source of about 300 luxes. Each 10 cc. of the emulsion of tetraethyleneglycol methacrylate prepared as above was mixed with the exposed photographic emulsion and with the unexposed one respectively. Further, 184 mg. of N,N-dimethyl-m-phenylenediamine hydrochloride, 6.3 mg. of sodium sulfite and 1.0 cc. of 1 N aqueous sodium hydroxide solution were added to each mixture.

When the same procedure as in Example 1 was conducted with the silver halide emulsions mentioned above while maintaining the water bath at a temperature of 50° C., in the system using the exposed silver halide emulsion, the temperature of the system increased to 94° C. by the heat of reaction, while the temperature of the system using the unexposed emulsion was only 60° C.

Thus, even if a water-insoluble or scarcely soluble monomer was employed, the monomer could be selectively polymerized in the presence of silver halide which was exposed to the irradiation of electromagnetic rays or particle rays by emulsifying the monomer and polymerizing.

EXAMPLE 3

In this example, a photographic light-sensitive film having a photographic gelatin silver chloroiodo-bromide emulsion layer was exposed and processed in a solution containing 2,6-diaminotoluene and sodium methacrylate to conduct an image-wise polymerization, and the thus formed image of polyacrylate was dyed by a basic dye.

The photographic film used was prepared as follows: Both surfaces of a polyethylene phthalate film base were undercoated and, after applying an antihalation layer to one side, a fine grain photographic gelatin silver halide emulsion was applied to the other side of the support, the comprising about 0.7 mole of chlorine, about 0.3 mole of bromine, about 0.001 mole of iodine, and about 100 g. of lime-processed gelatin per one mole of silver. The emulsion was added with a merocyanine dye having a maximum sensitivity at 550 m. as a sensitizing dye, 1.5 g. of mucochloric acid per 100 g. of gelatin as a hardening agent, and a suitable stabilizer and surface active agent so that the applied layer contained 50 mg. of silver per 100 cm.$^3$ of the layer. Thereafter, a protective layer comprising gelatin was applied to the emulsion layer in a thickness of about 0.8 micron. Such a photographic light-sensitive film is the type generally employed for preparing line and half-tone images for a photo-engraving process.

A negative having a line image was placed on the light-sensitive film (prepared above) and the emulsion layer was exposed for 10 seconds under a light of about 100 luxes. The thus-exposed photographic film was cut into two parts and the samples were immersed in the following solutions A and B respectively:

Composition A

| | | |
|---|---|---|
| Sodium methacrylate | g | 75 |
| 2,6-diaminotoluene | g | 5.5 |
| 2 N sodium hydroxide | ml | 29 |
| Water | ml | 75 |
| Potassium | g | 3 |

Composition B

Same composition as Composition A but containing sodium sulfite instead of potassium metabisulfite (in equivalent amounts).

A faint brown image was formed at the exposed areas when the sample film was allowed to stand for 45 minutes at 30° C. in the case of immersing in Composition A or for 30 minutes at 30° C. in the case of immersing in Composition B. Each of the samples was washed with a 1.5% acetic acid solution for 30 seconds and fixed in a fixing solution having the following composition:

| | G. |
|---|---|
| Anhydrous sodium thiosulfate | 150 |
| Potassium metabisulfite | 15 |
| Water to make 1 liter. | |

The thus-fixed sample was washed with water and immersed for 5 minutes in a 0.1% aqueous acetic acid solution containing a red basic dye. Rhodamine 6 G.C.P. (C.I. Basic Red 1) and then washed for 5 minutes with a 5% aqueous acetic acid solution, whereby the dye attached to the areas of the sample film having no brown image was washed out, while the image portions were dyed in red. The brown image was a silver image and hence could be dissolved off readily with a Farmer's reducer. When the brown image was removed, a clear red image was obtained.

Furthermore, by reversing the order of dyeing and removing the silver image, that is, by removing at first the silver image to make the image colorless and transparent, a clear red image could be obtained similarly by dyeing thereafter.

The dye image as formed above could be transferred to a paper. Thus, a writing paper was slightly wetted with methanol by rubbing the paper with a sponge impregnated with methanol, placed closely on the dye image bearing emulsion layer, and after pressing them for about 30 seconds, separated from the emulsion layer, a red image was transferred onto the paper.

Moreover, when a 0.1% aqueous solution containing Crystal Violet (C.I. Basic 3), was used in the above procedure, a dye image was prepared and transferred as in the above case to provide a blue-purple transferred image.

Also, when a 0.1% aqueous solution of Auramine O–100, (C.I. Basic Yellow 2) was used, a yellow image was obtained.

Furthermore, when a 0.1% aqueous solution of Basic Blue G.O. (C.I. Basic Blue 25) was used, a blue image was obtained.

In the case of transferring dye images thus-prepared, it is not necessary to remove the silver image or silver halide. Accordingly, by developing and polymerizing the emulsion layer, processing the layer in a stopping bath, and further, after washing it with water, directly dyeing and transferring the dye image, a sufficient transferred dye image could be obtained.

EXAMPLE 4

The photographic light-sensitive film as in Example 3 was exposed as in Example 3 and processed in a solution having the following composition and containing the reducing agent shown in Table II:

Methacrylic acid—58.9 ml.
Sodium carbonate mono-hydrate—43.0 g.
Reducing agent—Shown in Table II
Water—87.5 ml.
2 N sodium hydroxide solution—amount necessary for adjusting the pH to one shown in Table II
Potassium metabisulfite—3.0 g.

After processing at 30° C. for a time shown in Table II, the sample film was fixed and washed as in Example 3 and then dyed by 0.1% Rhodamine 6 G.C.P. About the exposed and unexposed portions of each sample, the transmission densities thereof to green light before and after dyeing were measured.

The kinds and amounts of the reducing agents, the pH values of the processing solution, the processing times, the optical density before dyeing, and the optical density after dyeing are shown in Table II.

TABLE II

| Reducing agent | (A) | (B) | (C) | | (D) | | pH |
|---|---|---|---|---|---|---|---|
| | | | (I) | (II) | (I) | (II) | |
| 2,4-diaminotoluene | 5.54 | 20 | 0.07 | 0.32 | 0.10 | 1.90 | 9.0 |
| Do | 5.54 | 20 | 0.08 | 0.32 | 0.08 | 1.12 | 11.6 |
| 2,4-diaminobenzene sulfonate | 9.63 | 50 | 0.08 | 0.20 | 0.08 | 0.24 | 9.0 |
| 2,4,6-triaminotoluene HCl | 11.1 | 20 | 0.13 | 0.48 | 0.16 | 1.88 | 9.0 |
| m-Phenylenediamine sulfate | 9.3 | 15 | 0.10 | 0.20 | 0.12 | 1.52 | 9.1 |
| m-Acetamino aniline | 8.82 | 70 | 0.07 | 0.16 | | 0.31 | 9.5 |
| 3,5-diamino benzoic acid | 6.84 | 45 | 0.27 | 0.74 | 0.28 | 2.43 | 12.1 |
| Methoxy red | 2.42 | 60 | 0.14 | 0.66 | 0.15 | 0.92 | 9.0 |
| 1,8-diaminonaphthalene | 0.71 | 30 | 0.16 | 0.63 | 0.24 | 1.71 | 11.6 |
| Do | 0.71 | 18 | 0.14 | 0.38 | 0.30 | 1.78 | 9.0 |
| 2,6-diaminotoluene | 5.5 | 45 | 0.10 | 0.80 | 0.12 | 2.45 | 11.6 |
| 2,7-diaminonaphthalene | 6.93 | 65 | 0.09 | 0.57 | 0.10 | 0.92 | 9.2 |
| 2,4-diaminoanisol | 9.27 | 20 | 0.13 | 0.45 | 0.51 | 1.32 | 11.5 |

NOTE.—(A) amount of reducing agent (g.); (B) processing time (min.); (C) density of unexposed portion; (D) density of exposed portion; (I) before dyeing; and (II) after dyeing.

From the above results, it was confirmed that in every case, the increase in optical density, caused by dyeing, of the exposed portion was higher than that of the unexposed portion and hence the polymerization had selectively occurred at the exposed portion.

EXAMPLE 5

The same procedure as in Example 4 was repeated, wherein, however, sodium sulfite was employed instead of potassium metabisulfite. The results are shown in Table III as in the same manner as in Example 4.

TABLE III

| Reducing agent | (A) | (B) | (C) | | (D) | | pH |
|---|---|---|---|---|---|---|---|
| | | | (I) | (II) | (I) | (II) | |
| 2,6-diaminotoluene | 5.49 | 45 | 0.11 | 0.40 | 0.11 | 2.30 | 9.20 |
| 3,5-diamino benzoic acid | 6.84 | 45 | 0.15 | 0.38 | 0.12 | 0.68 | 12.1 |

As clear from the above results, the polymerization occurred selectively at the exposed portions similarly when potassium metabisulfite was replaced with sodium sulfite.

EXAMPLE 6

The photographic light-sensitive film as in Example 3 was exposed as in that example and processed in a solution having the following composition to conduct the development and polymerization.

1-vinyl-2,3-dimethylimidazolium p-toluene
   sulfonate—75 g.
2,4-diaminoanisole—2.1 g.
Potassium pyrosulfite—3.0 g.
2 N sodium hydroxide—amount necessary for pH 11.5
Water—75 ml.

The 1-vinyl-2,3-dimethylimidazolium p-toluene sulfate used above was prepared by reacting 1-vinyl-2-methylimidazole and methyl p-toluenesulfonate at a normal temperature and recrystallizing the product from ethanol and ether. The melting point thereof was 142.5° C.

When the photographic film was processed as above for 23 minutes at 30° C., a faint brown silver image was formed together with the image of a quaternary salt polymer. That is, when the thus-processed film was fixed and washed as in Example 1, immersed in a 0.1% aqueous solution of a red acid dye, Solar Rhodamine B extra (C.I. Acid Red 52), for 5 minutes to dye the whole surface of the emulsion layer, then immersed in a Kolthoff's buffer solution for 3 minutes at a pH of 5.0, and washed with water, the sample was obtained wherein only the image-bearing portions were colored in red. By bleaching the silver of the sample as in Example 1, a clear red image could be obtained. Also, by placing the dye image-bearing emulsion layer on a paper wetted by methanol as in Example 1, the dye image could be transferred to the paper.

A gelatin layer was applied to a baryta paper in a thickness of about 10 microns and after immersing in an aqueous solution of alum, the paper was dried to provide a transfer paper. After wetting the transfer paper with water, the paper was closely brought into contact with the image-bearing emulsion layer obtained as above for one minute and then stripped therefrom to provide a clear red image having a high density on the transfer paper.

Furthermore, when the sample was dyed using a 0.1% aqueous solution of a blue acid dye, Suminol Leveling Sky Blue R extra conc. (C.I. Acid Blue 62), instead of Solar Rhodamine B extra, and then washed with a 1% sodium hydrogen carbonate solution, a blue image was obtained. The dye image could be transferred onto a paper wetted by methanol. Also, the dye could be transferred onto the aforesaid gelatin-layer of the paper wetted by water.

Also, when the polymer image was dyed by a yellow dye, Solar Pure Yellow 8G (C.I. Acid Yellow 7) or Tartrazine (C.I. Acid Yellow 23), and then washed with a buffer solution having a pH of 5.0, a yellow image was obtained. The dye image could be transferred onto a transfer paper wetted with water.

EXAMPLE 7

In this example, the polymerization of sodium methacrylate and 3,5-diaminobenzoic acid was conducted by using the following film A and film B each having a silver iodobromide emulsion layer.

Film A: Both surfaces of a cellulose triacetate film base were undercoated and an antihalation layer was applied to one side of the support. A medium grain gelatino silver halide emulsion containing about 0.015 mole of iodine, about 0.985 mole of bromine, and about 225 g. of gelatin per one mole of silver and also having incorporated therein about 0.5 g. of mucochloric acid per 100 g. of gelatine as a hardening agent and a suitable amount of surface active agent was applied to the other side of the support so that the coated layer contained 60 mg. of silver per 100 cm.$^3$ thereof. To the emulsion layer was applied further a protective layer of gelatin in a thickness of about 1 micron. The thus-prepared photographic film is the type generally used for preparing positives for photogravure.

Film B: A fine grain gelatino silver halide emulsion containing 0.012 mole of iodine, 0.988 mole of bromine, and about 204 g. of gelatin per one mole of silver, sensitized by a rhodan complex of monovalent gold, and having incorporated therein 0.3 g. of 6-methyl-4-hydroxy-1,3, 3a,7-tetraazaindene per 1 mole of silver as a stabilizer, about 0.7 g. of mucochloric acid per 100 g. of gelatin as a hardening agent, and a suitable surface active agent was applied to the support as in Film A so that the layer contained 60 mg. of silver per 100 cm.$^3$ thereof. Further, to the emulsion layer was applied a protective layer of gelatin in a thickness of about 0.8 micron. The thus-prepared photographic film is the type generally used for preparing line images or hard-tone continuous positive images for photoengraving.

Each of the photographic light-sensitive films was exposed to a light of 1000 luxes having a color temperature of 2880° K. for ½ second through an optical wedge of 0.15 density increment and then processed in a solution having the following composition:

Sodium methacrylate—60 g.
3,5-diaminobenzoic acid—6.8 g.
Potassium metabisulfite—3.0 g.
Water—60 ml.
2 N sodium hydroxide—to make pH value of 9.0.

By processing the film sample in the aforesaid solution for 45 seconds at 30° C., a faint-brown image was obtained in each case. After fixing and washing as in Example 6, the polymer image was dyed with Rhodamine 6 G.C.P., and a dye image was obtained. The dyeing density of the image was increased when the amount of exposure was increased.

EXAMPLE 8

In this example, the photographic light-sensitive film as in Example 3 was pre-treated with 1-phenyl-3-oxopyrazolidine and then the polymerization by development was conducted using diaminonaphthalene.

Two film samples were exposed, for 10 seconds, to a light of 50 luxes through an optical wedge of 0.15 density increment and processed in a solution having the following composition:

1-phenyl-3-oxopyrazolidine—0.3 g./liter
Sodium carbonate—the amount necessary for adjusting the pH of the solution to 9.0

Sample A was processed in the above solution for 0 seconds and sample B for 2 minutes at 30° C. The samples were washed three times with distilled water for 15 seconds each and thereafter processed in a solution having the following composition:

Sodium methacrylate—105 g.
1,8-diaminonaphthalene—1.0 g.
Potassium metabisulfite—4.2 g.
Water—105 ml.
2 N NaOH solution—the amount necessary for adjusting the pH of the solution to 9.0.

The sample film was processed for 15 minutes at 30° C. and after fixing and washing as in Example 3, the thus-formed polymer images were dyed and washed with water. After completely bleaching the samples with a Farmer's reducer, the optical density of the processed film corresponding to the fog at the unexposed portions were measured using a green filter, the results of which are shown in the following table.

TABLE IV

| Sample: | (X) | (Y) | (Z) |
| --- | --- | --- | --- |
| A | 0.32 | 0.37 | 15th step. |
| B | 0.28 | 0.74 | 19th step. |

NOTE.—(X)=the optical density at the unexposed portions, (Y)=the optical density at the 15th step, (Z)=the final step capable of dyeing the polymer image.

The density shown above is the density due to the dye dyed to the selectively-formed polymer image in proportion to the amount of exposure and hence corresponds to the amount of the polymer formed. The dyed and bleached sample was observed by the naked eye and the step number where the increase of the dyed density was first observed as compared with fog is shown as the final step capable of dyeing in the above table. Therefore, the final step number corresponds to the minimum exposure amount necessary for selectively forming the polymer and hence the sensitivity is higher when the final step number is larger. In other words, as the step difference of the optical wedge used is 0.15, the result that the final step number for sample B is 4 steps higher than that for sample A means that the same extent of polymerization as in sample A can be expected in sample B with ¼ of the exposure amount required for the polymerization in sample A. That is, the pre-treatment applied to sample B gave the same effect as the 4 times increase in exposure amount.

EXAMPLE 9

In Example 8, a conventional developing agent was used in the form of a pre-treatment bath but in this example, the conventional developing agent was used together with a m-phenylenediamine derivative. The light-sensitive film used was the same as in Example 3.

As the developing agent, catechol or p-methylaminophenol was used together with 2,4-diaminotoluene. In this experiment, four solutions having the following compositions A, B, C and D were employed.

|  | A | B | C | D |
|---|---|---|---|---|
| Sodium methacrylate, g | 150 | 150 | 150 | 150 |
| 2,4-diaminotoluene, g | 11 | 11 | 11 | 11 |
| Potassium metabisulfite, g | 6 | 6 | 6 | 6 |
| Water, ml | 150 | 150 | 150 | 150 |
| 2 N NaOH soln | (¹) | (¹) | (¹) | (¹) |
| Catechol, mg |  |  |  | 4.95 |
| p-Methylaminophenol, mg |  | 7.6 |  |  |

¹ The amount necessary for adjusting the pH of A and B to 9 and that of C and D to 10.5.

Each sample was processed at 30° C. for 10 minutes in solution A or B and for 25 minutes in solution C or D and, after subjecting the sample to the same post-processing steps as in Example 8, the optical densities were measured, the results of which are shown in the following table.

TABLE V

|  | A | B | C | D |
|---|---|---|---|---|
| Optical density at unexposed portion | 0.33 | 0.49 | 0.11 | 0.12 |
| Optical density at the 10th step | 0.34 | 0.67 | 0.12 | 0.31 |

As is clear from the above results shown in the table, in the case of using composition B in which 2,4-diaminotoluene was used together with p-methylaminophenol, the difference between the optical density at the 10th step, and the density (so-called fog) at the unexposed portions, that is, the increase in density caused by exposure, was larger and also the final step number capable of dyeing the polymer image to a just-perceptible degree was about 10 steps higher than the case of using composition A wherein 2,4-diaminotoluene was used alone. This means that the effective sensitivity of the former was about 30 times higher than that of the latter. The relation between case A and case B was also the same as the relation between case C wherein catechol was not used and case D wherein catechol was used.

Thus, when a conventional developing agent was used the formation of polymer was remarkably increased with the same amount of exposure and hence the exposure amount necessary for providing the same amount of polymer could be decreased as compared with the case of using no conventional developing agent.

EXAMPLE 10

In this example, the same photographic light-sensitive film as in Example 3 was exposed to X-rays and processed in the solution in the same way as in Example 3.

The X-ray exposure was conducted using a cobalt X-ray tube made by Philips Co. at 30 kv. and 10 lamp. The sample was positioned 1 cm. apart from the window of the X-ray tube while covering a part of the sample by a razor having a thickness of 0.2 mm. and exposed to X-rays for 30 seconds.

After processing the exposed sample in the solution as in Example 6 for 25 minutes at 30° C., the sample was fixed, washed with water, and dyed with Rhodamine 6 G.C.P. as in Example 6, whereby a silver image was formed only at the portion directly irradiated by X-rays and the image-bearing portion were selectively dyed.

As shown above, the process of the present invention can be applied to a silver halide emulsion exposed to a high energy radiation.

What is claimed is:

1. A process for forming a polymer image, which comprises applying to a photographic silver halide emulsion layer bearing a photographic latent image at least one reducing agent selected from the group consisting of a metaphenylenediamine, 1,3-diaminonaphthalene, 1,6-diaminonaphthalene, 1,8-diaminonaphthalene, and 2,7-diaminonaphthalene, in the presence of at least one member selected from the group consisting of an addition-polymerizable vinylidene monomer and a vinyl monomer, and conducting the polymerization of said monomer selectively at the latent image-bearing portion of said emulsion layer, said metaphenylenediamine represented by the formula:

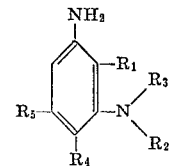

wherein $R_1$ represents a member selected from the group consisting of a hydrogen atom, an alkyl group, and a carboxyl group; $R_2$ and $R_3$ each represent a member selected from the group consisting of a hydrogen atom, an alkyl group and an acryl group; $R_4$ represents a member selected from the group consisting of a hydrogen atom, a sulfonyl group, an alkyl group, a methoxy group, and an arylazo group; and $R_5$ represents a member selected from the group consisting of a hydrogen atom, an amino group, and a carboxyl group.

2. The process as in claim 1 wherein said polymerization is conducted in the presence of sulfite ions.

3. The process as in claim 1 wherein said polymer image is selectively dyed by a dye having charges opposite to the charges of said polymer image when said dye is electrolytically dissociated.

4. The process as in claim 1 wherein a small amount of a conventional photographic developing agent is used together with said metaphenylenediamines or said diaminonaphthalenes.

5. The process as in claim 4 wherein said developing agent is a compound selected from the group consisting of a conventional developing agent having a structure represented by the formula

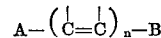

wherein A and B each represents —OH, —NH₂ or —NHR (wherein R is selected from the group consisting of an alkyl group and a substituted alkyl group) and $n$ is a positive integer, a 1-aryl-3-oxopyrazolidine and a 1-aryl-3-iminopyrazolidine.

6. The process as in claim 1 wherein said photographic silver halide emulsion layer bearing a latent image is preliminarily processed in a bath containing a conventional photographic developing agent prior to conducting said polymerization.

7. The process as in claim 6 wherein said conventional developing agent is a compound selected from the group consisting of a conventional developing agent having a structure represented by the formula

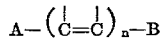

wherein A and B each represents —OH, —NH$_2$ or —NHR (where R is selected from the group consisting of an alkyl group and a substituted alkyl group) and $n$ is a positive integer, a 1-aryl-3-oxopyrazolidine and a 1-aryl-3-iminopyrazolidine.

8. A process as in claim 1, wherein said polymerization is caused by exposing said emulsion layer containing said vinyl compound to radiation.

9. A process as in claim 8, wherein said vinyl compound is selected from the group consisting of acrylamide, acrylonitrile, N-hydroxymethyl acrylamide, methacrylic acid, acrylic acid, calcium acrylate, sodium acrylate, methacrylamide, methyl methacrylate, methyl acrylate, ethyl acrylate, vinyl-pyrrolidone, vinyl methyl ether, vinyl butyl ether, vinyl isopropyl ether, vinyl isobutyl ether, vinyl butyrate, 2-vinyl-pyridine, 4-vinylpyridine, 2-methyl-N-vinylimidazole, potassium vinylbenzene sulfonate, vinylcarbazole, and the like.

10. A process as in claim 8, wherein said vinyl compound has more than one vinyl group and is selected from the group consisting of N,N'-methylenebisacrylamide, ethyleneglycol dimethacrylate, diethyleneglycol dimethacrylate, triethyleneglycol dimethacrylate, polyethyleneglycol dimethacrylate, divinyl ether, and divinylbenzene.

11. The process of claim 2, wherein the precursor for said sulfite ions is a member selected from the group consisting of an alkali metal sulfite, an ammonium sulfite, an aldehyde sulfite adduct, an alkali metal bisulfite, ammonium bisulfite, and an alkali metal pyrosulfite.

12. The process of claim 11, wherein said aldehyde is a member selected from the group consisting of formaldehyde and glyoxal.

13. The process of claim 2, wherein said sulfite is present in an amount greater than 0.05 mol per liter of reaction system.

14. The process of claim 13, wherein said sulfite is present in an amount greater than 0.2 mol per liter of reaction system.

15. The process of claim 1, wherein said polymerization takes place at a pH greater than 6.

16. The process of claim 1, wherein said polymerization takes place at a pH greater than 7.

17. The process of claim 1, wherein said vinyl compound and a high molecular weight binder material for said silver halide are preliminarily formed into a layer, said layer containing therein a small amount of a thermopolymerization inhibitor to prevent the vinyl compound from being thermally polymerized.

18. The process of claim 17, wherein said polymerization inhibitor is a member selected from the group consisting of p-methoxy phenol, hydroquinone, an alkyl hydroquinone, 2,6-di-t-butyl-p-cresole and β-napthol.

19. The process of claim 1, wherein said vinyl compound is preliminarily incorporated into the reaction system and is present in an amount of form 1/30 to 30 times the amount of the high molecular weight compound added preliminarily.

20. The process of claim 19, wherein said vinyl compound is present in an amount of from ¼ to 4 times the amount of the high molecular weight compound added preliminarily.

21. The process of claim 1, wherein said silver halide is present in an amount of from 1/100 to 2 times the amount of the high molecular weight compound.

22. The process of claim 21, wherein said silver halide is present in an amount of from 1/10 to ½ times the amount of the high molecular weight compound.

23. The process of claim 17, wherein said polymerization inhibitor is present in an amount of from 1/10,000 to 2/100 times the amount of said vinyl compound.

24. The process of claim 1, wherein said reducing agent is present in an amount of from 1/10 to 20 mols per mol of silver halide employed.

25. The process of claim 1, wherein said reducing agent is incorporated into a processing solution, in an amount of from 1/20 to 5 mols per liter.

26. The process of claim 25, wherein the amount of said reducing agent ranges from 1/10 to 1 mol per liter.

27. The process of claim 3, wherein said polymer is negatively charged and is a vinyl compound having a member selected from the group consisting of a carboxylic group, a metal salt of a carboxyl group, an ammonium salt of a carboxyl group, a sulfonyl group, a metal salt of sulfonic acid, and the ammonium salt of sulfonic acid.

28. The process of claim 3, wherein said polymer is positively charged and is a vinyl compound having a member selected from the group consisting of a basic nitrogen atom, and a nitrogen atom of a quaternary salt, prepared by reacting a base of the aforesaid vinyl compound with a member selected from the group consisting of methyl chloride, ethyl bromide, dimethyl sulfate, diethyl sulfate, and methyl p-toluene-sulfonate.

29. The process of claim 3, wherein said vinyl compound is employed in combination with a water soluble addition polymerizable vinyl compound having no charge and being a member selected from the group consisting of acrylamide, N-hydroxymethylacrylamide, methacrylamide, methylmethacrylamide, vinyl pyrrolidone, N,N-methylene-bis-acrylamide, triethylene glycol dimethacrylate, and polyethylene glycol dimethacrylate.

30. A process for forming a polymer image which comprises applying to a photographic silver halide emulsion layer bearing a photographic latent image, at least one reducing agent selected from the group consisting of a metaphenylenediamine, 1,3-diaminonaphthalene, 1,6-diaminonaphthalene, 1,8-diaminonaphthalene, and 2,7-diaminonaphthalene, in the presence of at least one member selected from the group consisting of an addition polymerizable vinylidene monomer and a vinyl monomer, and conducting the polymerization of said monomer selectively at the latent image-bearing portion of said emulsion layer, said metaphenylene diamine represented by the formula:

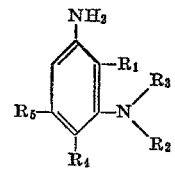

wherein R$_1$ represents a member selected from the group consisting of a hydrogen atom, an alkyl group and a carboxyl group; R$_2$ and R$_3$ each represent a member selected from the group consisting of a hydrogen atom, an alkyl group and an acryl group; R$_4$ represents a member selected from the group consisting of a hydrogen atom, a sulfonyl group, an alkyl group, a methoxy group, and an arylazo group; and R$_5$ represents a member selected from the group consisting of a hydrogen atom, an amino group and a carboxyl group, and said vinyl compound being a member selected from the group consisting of acrylamide, acrylonitrile, N-hydroxymethylacrylamide, methacrylic acid, acrylic acid, calcium acrylate, sodium acrylate, methacrylamide, methylmethacrylate, methylacrylate, ethylacrylate, vinyl-pyrrolidone, vinyl methyl ether, vinyl butyl ether, vinyl isopropyl ether, vinyl isobutyl ether, vinyl butyrate, 2-vinyl-pyridine, 4-vinyl pyridine, 2-methyl-N-vinylimidazole, potassium vinyl benzene sulfonate, vinyl carbazole, N,N'-methylenebisacrylamide, ethyleneglycol dimethacrylate, diethylene glycol dimethacrylate, triethylene glycol dimethacrylate, polyethylene glycol dimethacrylate, divinyl ether, and divinyl benzene.

References Cited

UNITED STATES PATENTS

| | | | |
|---|---|---|---|
| 2,887,376 | 5/1959 | Tupis | 96—35.1 |
| 3,019,104 | 1/1962 | Oster | 96—29 |
| 3,038,800 | 6/1962 | Luckey et al. | 96—35 |

OTHER REFERENCES

Mees, C. E. K.: "The Theory of the Photographic Process," 1942, pages 347–348.

RONALD H. SMITH, Primary Examiner

U.S. Cl. X.R.

96—35.1, 115 P